United States Patent
Okazaki et al.

(10) Patent No.: US 7,060,230 B2
(45) Date of Patent: Jun. 13, 2006

(54) APPARATUS FOR TREATMENT OF WASTE GAS

(75) Inventors: Kazuto Okazaki, Himeji (JP); Takeshi Nishimura, Himeji (JP); Kazuhiko Sakamoto, Himeji (JP); Osamu Dodo, Hyogo (JP)

(73) Assignee: Nippon Shokubai, Co., Ltd., Osaka (JP)

( * ) Notice: Subject to any disclaimer, the term of this patent is extended or adjusted under 35 U.S.C. 154(b) by 500 days.

(21) Appl. No.: 09/870,812

(22) Filed: May 31, 2001

(65) Prior Publication Data

US 2002/0006593 A1 Jan. 17, 2002

(30) Foreign Application Priority Data

Jun. 5, 2000 (JP) .............................. 2000-167973

(51) Int. Cl.
*B01D 50/00* (2006.01)
(52) U.S. Cl. ..................................................... 422/177
(58) Field of Classification Search ........ 422/168–183; 423/210, 236, 245; 23/230

See application file for complete search history.

(56) References Cited

U.S. PATENT DOCUMENTS

| 3,988,423 | A | * | 10/1976 | Ohrui et al. ................. 423/236 |
| 4,038,032 | A | * | 7/1977 | Brewer et al. ................. 436/55 |
| 4,101,632 | A | * | 7/1978 | Lamberti et al. ........... 423/246 |
| 4,418,045 | A | * | 11/1983 | Sato et al. ................ 423/245.3 |
| 4,820,500 | A | | 4/1989 | Obermuller |
| 4,983,364 | A | | 1/1991 | Buck et al. |
| 5,375,562 | A | | 12/1994 | Brinck et al. |
| 5,458,862 | A | | 10/1995 | Glawion |

FOREIGN PATENT DOCUMENTS

JP A-57-58012 11/1983

* cited by examiner

Primary Examiner—Glenn Caldarola
Assistant Examiner—Tom Duong
(74) Attorney, Agent, or Firm—Mathews, Shepherd, McKay & Bruneau, P.A.

(57) ABSTRACT

An apparatus for the treatment of a waste gas that is capable of recovering the heat generated by the catalytic oxidation of a waste gas to the largest possible extent and allowing the temperature of the treated gas in a first waste gas pre-heater to be adjusted to an arbitrary level incapable of condensing moisture and/or corrosive gas is provided. The apparatus for the treatment of the waste gas includes a molecular oxygen-containing gas supplying device, second to n'th waste gas pre-heaters, a heat-recovering device, and a reactor.

3 Claims, 2 Drawing Sheets

APPARATUS FOR TREATMENT OF WASTE GAS

BACKGROUND OF THE INVENTION

1. Field of the Invention

This invention relates to an apparatus for the treatment of waste gas containing a combustible compound and a method for the treatment of the waste gas by the use of the apparatus.

2. Description of the Related Art

The waste gas discharged from the process for the production of chemical substances possibly contains combustible compounds such as saturated hydrocarbons like methane, ethane or propane, unsaturated hydrocarbons like ethylene, or propylene, carbon monoxide, organic acids like phthalic acid, maleic acid, or (meth)acrylic acid, aldehydes like formaldehyde, esters, or alcohols in small amounts either singly or in the form of a mixture. These combustible compounds will emit offensive odor even in a small amount. Their release into the atmosphere without treatment is hardly agreeable.

As one such measure, JP-A-57-58012 proposes an apparatus for the treatment of the waste gas. FIG. 1 is a diagram illustrating the apparatus for the treatment of the waste gas, which is disclosed in JP-A-57-58012. In FIG. 1, the apparatus is operated by heating the waste gas supplied through a first heat exchanger 2 and a second heat exchanger 3 disposed in series between a device for supplying the waste gas and a catalytic oxidation reactor 1, supplying part of the hot treated gas emanating from the reactor 1 to the second heat exchanger 3 as the heat source, supplying the treated gas emanating from a heat-recovering device 4 to the first heat exchanger 2 as the heat source, supplying part or the whole of the treated gas used in the second heat exchanger 3 to the reactor 1, and supplying the remainder of the treated gas together with the waste gas emanating from the reactor 1 to the heat-recovering device 4. By allowing the treated gas used in the first heat exchanger 2 to be discharged out of the system, it is possible to maintain the appropriate reaction in temperature with the reactor 1 without addition of unnecessary air. Further by recovering the generated heat utilizing the heat-recovering device 4, it is possible to decrease the heat loss to the outside of the system. That is, since the heat-recovering device 4 absorbs the variation of the heat generated by the reaction due to the conversion of the composition of combustible substances in the waste gas, the temperature of the treated gas emanating from the first heat exchanger is maintained at a substantially fixed level. When the amount of oxygen in the waste gas is not sufficient for the treatment of the combustible component, air may be added in advance into the waste gas to treat it.

In consequence of variations in the operating conditions during the production process, the composition of the waste gas discharged from the process is often changed and this change possibly induces a change in the dew point of the treated gas and causes condensation in the first heat exchanger 2. The waste gas may include a small amount of corrosive substances such as sulfur, which causes corrosion in the heat exchanger due to the condensation. Further, since the dust of the aerated catalyst is scattered from the reactor 1 in the long run, the dust adheres to the portions covered with the condensate possibly to lower the heat exchange ability.

For the purpose of avoiding this situation, it is necessary to elevate the temperature of the treated gas being supplied to the first heat exchanger 2, namely the temperature of the treated gas at the outlet of the heat-recovering device 4.

When a waste heat boiler is used for the heat-recovering device 4, for example, the method of decreasing the amount of heat recovered in the boiler and elevating the temperatures of the treated gas at the inlet and the outlet of the first heat exchanger by increasing the steam pressure generated in the boiler, namely elevating the evaporation temperature is conceivable. Since the steam generated in the boiler is generally connected to the steam system in the plant, it is commendable for the pressure of the steam supplied to the steam system to be maintained at a fixed level. For this reason, it is extremely difficult to adjust the temperature of the treated gas at an arbitrary level by varying the steam pressure generated in the waste heat boiler in accordance with the operation condition of the apparatus for the treatment of the waste gas. As a result, the waste gas subjected to the treatment is limited in a narrow range and the apparatus possibly fails to apply to the treatment of the waste gas discharged from the production process.

SUMMARY OF THE INVENTION

An object of the present invention is, therefore, to provide an apparatus for the treatment of the waste gas that has a wide adaptability for operation in correspondence to variations in the composition of the waste gas discharged mainly from the production process of organic compounds, namely that is capable of adjusting the temperature of the treated gas in a first waste gas pre-heater to an arbitrary temperature not lower than the dew point thereof, capable of being stably operated without the supply of the molecular oxygen-containing gas in an unduly large amount, and capable of recovering the heat generated by the catalytic oxidation of the waste gas to the largest possible extent.

We, as a result of pursuing a diligent study concerning the problems mentioned above, have found that by supplying a molecular oxygen-containing gas to the inlet of a catalytic oxidation reactor, utilizing part or the whole of the treated gas emanating from the reactor as the heat source for a second waste gas pre-heater and/or a heat-recovering device, and further supplying part or the whole of the treated gas emanating from the second pre-heater as the heat source for the first pre-heater, it is possible to adjust the temperature of the treated gas in the first pre-heater at an arbitrary temperature not lower than the dew point of the gas. This invention has been perfected as a result.

Further, the object of this invention, therefore, consists in eliminating the problems mentioned above and providing a method for the treatment of the waste gas by the use of the apparatus for the treatment of waste gas that is capable of adjusting the temperature of the waste gas in the waste gas pre-heater to an arbitrary level.

This invention relates to an apparatus for the treatment of waste gases, characterized by comprising a catalytic oxidation reactor for the treatment of a waste gas containing combustible compounds; a device for supplying the waste gas to the reactor; plural preheating devices for preheating the waste gas; and a heat-recovering device for recovering the heat of the treated gas emanating from the reactor; being provided with a molecular oxygen-containing gas supplying device for supplying a molecular oxygen-containing gas to at least one arbitrary point between the waste gas inlet of a first waste gas pre-heater and the inlet of the reactor (wherein the term "first waste gas pre-heater" as used herein means the pre-heater to which the waste gas is supplied first where the pre-heaters are disposed in series or either of the pre-heaters where the pre-heaters are disposed parallelly); being adapted to supply the treated gas emanating from the reactor as the heat source to at least one of the second to n'th waste gas pre-heaters and the heat-recovering device (wherein the term "n'th waste gas pre-heater" means the pre-heater to which the treated gas is supplied first where the pre-heaters are disposed in series or the pre-heater to which the treated gas is supplied first where the pre-heaters are disposed parallelly); being constructed to use the treated gas emanating from at least one of the second to n'th waste gas pre-heaters as mixed with the waste gas supplied to the reactor and supply the treated gas emanating from the heat-recovering device to the first pre-heater; or being constructed to supply the treated gas emanating from any one of the second to n'th waste gas pre-heaters and the treated gas emanating from the heat-recovering device to the first pre-heater as the heat source.

Further, this invention relates to a method for the treatment of the waste gas by the use of the apparatus mentioned above.

Though the number, n, of the pre-heaters is not particularly limited, the limit up to n=2 is preferred from the viewpoint of the convenience of operation.

Further, this invention relates to an apparatus for the treatment of waste gases, characterized by comprising a catalytic oxidation reactor for the treatment of a waste gas containing combustible compounds; a device for supplying the waste gas to the reactor; plural preheating devices for preheating the waste gas; and a heat-recovering device for recovering the heat of the treated gas emanating from the reactor; being provided with a molecular oxygen-containing gas supplying device for supplying a molecular oxygen-containing gas to at least one arbitrary point between the waste gas inlet of a first waste gas pre-heater and the inlet of the reactor (wherein the term "first waste gas pre-heater" as used herein means the pre-heater to which the waste gas is supplied first where the pre-heaters are disposed in series or either of the pre-heaters where the pre-heaters are disposed parallelly); being adapted to supply part or the whole of the treated gas emanating from the reactor to at least one of the second to n'th waste gas pre-heaters (wherein the term "n'th waste gas pre-heater" as used herein means the pre-heater to which the treated gas is supplied first where the pre-heaters are disposed in series or the pre-heater to which the treated gas is supplied first where the pre-heaters are disposed parallelly); and being constructed to supply the treated gas emanating from the second to n'th waste gas pre-heaters to the first pre-heater as the heat source and supply the treated gas emanating from the first pre-heater and the reactor (inclusive of the case wherein the amount of the treated gas to be supplied is zero)to the heat-recovering device as the heat source.

Further, this invention relates to a method for the treatment of a waste gas by the use of the apparatus mentioned above.

Though the number, n, of the pre-heaters is not particularly limited, the limit up to n=2 is preferred from the viewpoint of the convenience of operation.

In accordance with the present invention, it is enabled to elevate the temperature of the treated gas at the outlet of the first pre-heater to a level higher than the dew point of the gas for the same amount of the molecular oxygen-containing gas as in the conventional apparatus and consequently eliminate the trouble related to condensation and permit the heat generated by the catalytic oxidation of the waste gas to be recovered to the largest possible extent.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings.

DESCRIPTION OF THE PREFERRED EMBODIMENTS

This invention will be described below based on the drawings attached hereto. As used hereinafter, the term "waste gas" refers to the combustible compound-containing gas to be treated and the term "treated gas" refers to the gas that has been treated in a catalytic oxidation reactor and subsequently discharged from the reactor.

Figure 2:
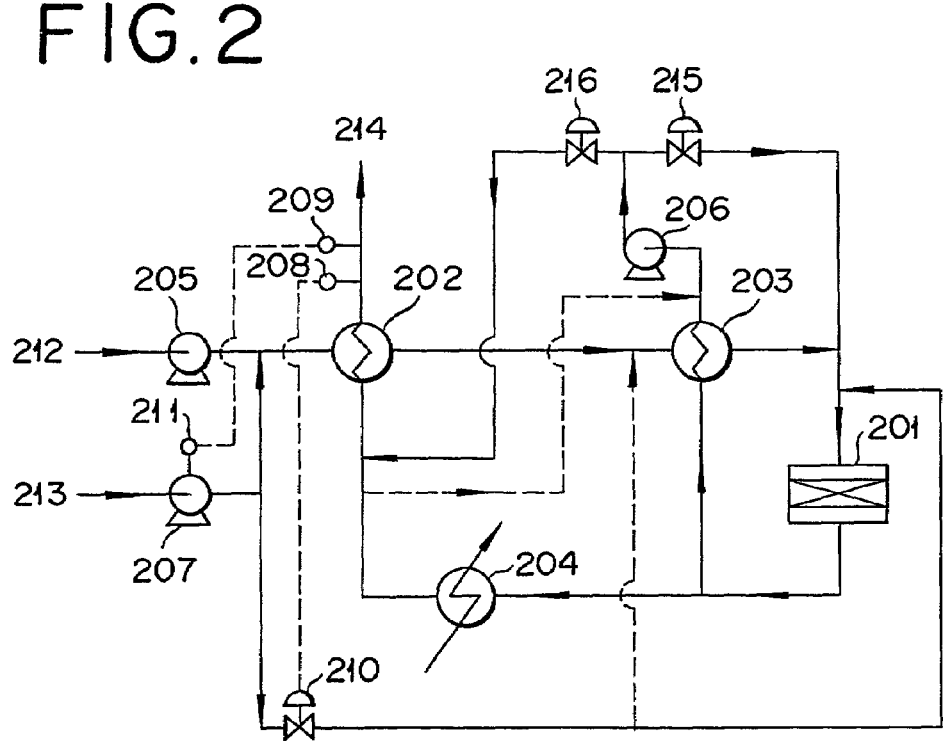
FIG. 2 is a diagram illustrating one flow sheet of the apparatus of this invention for the treatment of a waste gas.

FIG. 2 is a diagram illustrating one example of the flow sheet of the apparatus of this invention for the treatment of a waste gas. In FIG. 2, two waste gas pre-heaters are disposed between a waste gas-supplying device 205 and a catalytic oxidation reactor 201 and disposed in series along the flow of the waste gas. A waste gas 212 containing combustible compounds is supplied by the waste gas-supplying device 205 to a first waste gas pre-heater 202 and a second waste gas pre-heater 203, heated to an appropriate temperature with the treated gas emanating from the reactor 201 and a heat-recovering device 204, and thereafter supplied to the reactor 201.

This waste gas 212 generally contains the waste gas discharged from the production process such a chemical substance as phthalic acid, maleic acid, ethylene oxide, (meth)acrylicacid,ora (meth) acrylicester. Thewastegases from the various processes arise single or in the form of a mixture. The waste gas-supplying device 205 is not particularly limited but only required to be capable of supplying the waste gas 212. Examples of the waste gas-supplying device may include rotary machines such as blower and fan. Besides, supplying method utilizing the column operating pressure itself in case of the waste gas is supplied from absorbing or stripping columns operated under pressurized condition, or the waste gas supplying device installed at the outlet of the treated gas from the apparatus for the waste gas treatment to evacuate the apparatus and eventually suck the waste gas can be cited as means for supplying the waste gas.

The first pre-heater 202 refers to a waste gas pre-heater that effects the temperature elevation of the waste gas by using the treated gas emanating from the heat-recovering device 204 and/or the second pre-heater 203 as the heat source. The second pre-heater 203 refers to a waste gas pre-heater that effects the temperature elevation of the waste gas by using the treated gas emanating from the reactor 201 as the heat source. These waste gas pre-heaters are only required to be installed one each at least. The numbers thereof are not particularly limited. These waste gas pre-heaters are not restricted on account of the model and only required to be capable of elevating the temperature of the waste gas by exchange of heat. Any of the heretofore known heat exchanges can be used as the waste gas pre-heaters. The plate type heat exchangers can be used particularly advantageously among other types.

A molecular oxygen-containing gas supplying device 207 is connected to the waste gas line at an arbitrary point between the waste gas inlet of the first pre-heater 202 and the inlet of the reactor 201. Specifically, the supplying device 207 is connected to the waste gas inlet of the first pre-heater 202, between the waste gas outlet of the first pre-heater 202 and the waste gas inlet of the second pre-heater 203, and/or between the waste gas outlet of the second pre-heater 203 and the inlet of the reactor 201. Preferably, this connection is made between the waste gas outlet of the first pre-heater 202 and the inlet of the reactor 201, especially to the inlet of the reactor 201. The term "molecular oxygen-containing gas 213" as used herein involves air, oxygen gas, oxygen-enriched air, and the molecular oxygen-containing treated gas discharged from the other facilities.

The device for supplying the molecular oxygen-containing gas 213 will be considered now on the assumption that a blower without the function to control revolution, for example, is adopted. The flow volume of the molecular oxygen-containing gas 213 supplied to between the waste gas-supplying device 205 and the first pre-heater 202 (hereinafter occasionally referred to as "the amount of the molecular oxygen-containing gas for premix") is adjusted in accordance with the oxygen gas concentration in the treated gas or the supplying amount of the bypass oxygen-containing gas (the oxygen-containing gas supplied to the inlet of the second pre-heater and/or the inlet of the reactor) is adjusted in accordance with the temperature of the treated gas at the outlet of the first pre-heater, respectively by the use of the control valve. In this case, since the amounts of such molecular oxygen-containing gases are controlled in response to the signals issued from the detectors disposed respectively, the discharging amount of the blower possibly fluctuates from the amount inherently necessary for the treatment of the waste gas. This fluctuation due to the deviation from the amount to be required for waste gas treatment may cause hunting of the system. As a result, it becomes difficult to operate the reactor stably. Further, since decreasing the amount of the discharge gas reduces the pressure loss in the reactor, the discharge pressure of the blower can be reduced. Since diminishing the flow volume with the control valve increases the pressure loss, the blower consumes unnecessary electric power and the condition will results in an uneconomical operation. For the purpose of performing the treatment of the waste gas itself stably, it is necessary to prevent the fluctuation of the amount of the gas from the blower. Measuring the oxygen gas concentration in the treated gas and adjusting the amount of discharge gas from the blower based on this concentration can eliminate this problem.

The molecular oxygen-containing gas supplying device 207 is so constructed as to receive the signal from an oxygen concentration detector 209 disposed in the pipe on the treated gas outlet side of the first pre-heater 202. To be specific, when the oxygen gas concentration in the treated gas discharged from the first pre-heater 202 is found by measurement to be unduly low, the molecular oxygen-containing gas is supplied with a conventionally known gas-supplying device such as a blower or a fan that is furnished with a driving part capable of being driven at various revolutions. As regards the method for measuring the oxygen gas concentration in the treated gas, since the treated gas system from the reactor 201 onward admits no gas from any other device and the oxygen concentration is not changed in the system, the oxygen concentration detector 209 can be installed at an arbitrary position in the treated gas system. Examples of the measuring means may include known oxygen gas measuring means of the magnetic type and the zirconia type. For a device 211 to adjust the amount of the discharged molecular oxygen-containing gas, inverter control device to control revolution or reduction ratio control device, in particular a method to control revolution of motor by inverter control device may be cited.

Specifically, by being furnished with the detector 209 to measure the oxygen gas concentration in the treated gas, the molecular oxygen-containing gas supplying device 207 provided with a driving part capable of being driven at various revolutions, and the device 211 to adjust the discharge amount of the supplying device, it is possible to adjust the amount of the molecular oxygen-containing gas and supply the oxygen-containing gas required for the catalytic oxidation of the waste gas just enough.

A controller 210 to adjust the amount of the bypass molecular oxygen-containing gas is so constructed as to receive the signal from a treated gas temperature measuring means 208 that is disposed in the pipe on the treated gas out let side of the first pre-heater 202. When the temperature of the treated gas from the first pre-heater 202 is found by measurement to be lower than the prescribed level, the controller 210 is actuated to increase the amount of the bypass molecular oxygen-containing gas. Incidentally, the temperature of the treated gas emanating from the first pre-heater is controlled by utilizing the known detector such as a resistance thermometer using platinum, nickel, copper, or sheath or a thermocouple thermometer using copper-constantan, iron-constantan, chromel-alumel, or platinum-rhodium-platinum. The molecular oxygen-containing gas is supplied to the point between the first pre-heater 202 and the second pre-heater 203 and/or between the second pre-heater 203 and the reactor 201. When the temperature of the treated gas emanating from the first pre-heater 202 is lower than the dew point of the gas, for example, the amount of the bypass molecular oxygen-containing gas can be increased under the condition where the amount of oxygen-containing gas discharged from supplying device 207 is kept at a fixed level. In an extreme case, the discharge gas from the molecular oxygen-containing gas supplying device 207 is supplied in its whole amount as the bypass molecular oxygen-containing gas. Conversely, when such temperature is unduly high from the dew point of the gas, it becomes necessary to lower the temperature from the economic point of view. As occasion demands, the discharge gas from the molecular oxygen-containing gas supplying device 207 is supplied in its whole amount as the molecular oxygen-containing gas for premix. Example of the controller 210 to adjust the amount of the bypass molecular oxygen-containing gas may include a control valve, which has been known to the art.

Specifically, by being provided with the controller 208 to measure the temperature of the treated gas emanating from the first pre-heater and the controller 210 to adjust the amount of the molecular oxygen-containing gas supplied to an arbitrary point between the waste gas outlet of the first pre-heater and the inlet of the reactor, it is possible to divide the molecular oxygen-containing gas being supplied and adjust the temperature of the treated gas emanating from the waste gas pre-heater at an arbitrary level.

By adjusting the discharge amount of the blower by the revolution control and adjusting the amount of the bypass molecular oxygen-containing gas by the control valve, therefore, it is possible to operate the reactor stably with the temperature of a treated gas 214 arbitrarily adjusted meanwhile.

In the reactor 201, combustible compounds contained in the waste gas are disposed, namely treated by oxidation, by the use of an oxidation catalyst. The degree of perfect oxidation of the combustible organic compounds in the waste gas is confirmed with an analyzer such as a gas chromatography, as occasion demands. The oxidation catalyst used herein may be selected from among the oxidation catalysts known to the art. Examples of the oxidation catalyst may include molded pieces of a refractory inorganic oxide such as activated alumina, activated carbon, titania, or zeolite having an active component such as a noble metal like platinum or palladium or a base metal like copper, cobalt, nickel, or iron dispersed therein or superposed thereon or honeycomb structures of cordierite coated with the active component dispersed in the refractory inorganic oxide. Since the saturated hydrocarbons are not easily burned while the unsaturated hydrocarbons are burned relatively easily, it is commendable to fix the inlet temperature of the reactor at a level of not lower than 250° C. and the outlet temperature of the reactor at a level in the range of 650–700° C. and further the temperature elevation in the catalyst layer at a level of not higher than 430° C.

The heat-recovering device 204 is disposed between the reactor 201 and the first pre-heater 202. The second pre-heater 203 is disposed between the reactor 201 and a circulation blower 206. The outlet of the heat-recovering device 204 is connected with a pipe to the inlet of the circulation blower 206 as well as to the first pre-heater 202. The outlet of the circulation blower 206 is connected to the reactor 201 via a control valve 215 and to the inlet of the first pre-heater 202 via a control valve 216 respectively. Part or the whole of the treated gas emanating from the reactor 201 is utilized as the heat source for the second pre-heater 203 and the heat-recovering device 204.

The hot treated gas emanating from the reactor 201 is supplied to the heat-recovering device 204, which is a known waste heat boiler and the second pre-heater 203. The treated gas that has been supplied to the second pre-heater 203 is used to elevate temperature of the waste gas therein and then supplied to the inlet of the first pre-heater 202 via the circulation blower 206 and the control valve 216. By this procedure, it is possible to preheat the waste gas and, at the same time, elevate the temperature of the treated gas emanating from the first pre-heater 202. Thus, the apparatus is so constructed as to utilize the treated gases emanating from the heat-recovering device 204 and the second pre-heater 203 as the heat source for the first pre-heater 202.

Further, the treated gas supplied via the second pre-heater 203 and part of the treated gas supplied via the heat-recovering device 204, when necessary, are supplied to the reactor 201 via the circulation blower 206 and the control valve 215. By this procedure, it is possible to increase the amount of the gas entering the reactor 201 and permit effective recovery of the heat generated therein. Thus, the treated gas emanating from the second pre-heater 203 and part of the treated gas emanating from the heat-recovering device 204, when necessary, can be supplied to the reactor 201.

Further, the hot treated gas emanating from the reactor 201, if necessary, may be passed solely through the heat-recovering device 204.

The treated gas that has elevated the temperature of the waste gas in the first pre-heater 202 and has been consequently brought to a lowered temperature is supplied to the treated gas-discharging device (not illustrated) and released into the atmosphere. Further, since the oxygen in the treated gas has been consumed in the oxidation of harmful components and, therefore, is in a very scarce state, it is permissible to promote effective utilization of the treated gas as an inert gas, as a seal gas for storage tanks, or as a diluent gas for the oxidation reaction in some other facilities.

The treatment of the waste gas is carried out stably by adjusting the flow volume of the treated gas with the control valve, in accordance with the increase or decrease of the molecular oxygen-containing gas and the change of the inlet and outlet temperatures of the reactor. When the heat generated by the waste gas is small, for example, it is possible to fix the temperature of the treated gas of the first pre-heater at a level not lower than the dew point of the gas by using the whole amount of the molecular oxygen-containing gas as the bypass oxygen-containing gas and supplying the treated gas from the heat-recovering device and the second pre-heater to the first pre-heater as the heat source. When the heat generated by the waste gas is large, it is possible to fix the temperature of the treated gas from the first pre-heater at a level not lower than the dew point of the gas by using the molecular oxygen-containing gas as the molecular oxygen-containing gas for premix and as the bypass oxygen-containing gas and supplying the treated gas from the heat-recovering device to the first pre-heater as the heat source (in this case, the treated gas of the second pre-heater and, as occasion demands, part of the treated gas from the heat-recovering device are introduced into the inlet of the reactor). As a result, the flow volume balance and the heat balance of gases in the apparatus for the treatment can be changed more widely than when the molecular oxygen-containing gas is supplied in advance and disposed in the conventional apparatus and the temperature of the treated gas outlet of the first pre-heater can be adjusted to an arbitrary level not lower than the dew point of the gas. Thus, the supplying device does not need to be operated with an unduly high discharge pressure. This fact proves highly advantageous from the viewpoint of saving energy.

Incidentally, the equipments, devices, and means that form the apparatus are suitably connected with pipes.

The apparatus described above has two waste gas pre-heaters disposed in series. In the case of the apparatus using three such waste gas pre-heaters, the method of disposing the three waste gas pre-heaters between the first pre-heater 202 and the second pre-heater 203 or the method of disposing them between the second pre-heater 203 and the reactor 201 (prior to the supply of the molecular oxygen-containing gas) may be conceived. In this case, the flows of the waste gas and the treated gas are substantially the same as illustrated in FIG. 2. These waste gas pre-heaters are reckoned as the first, second, and third waste gas pre-heaters as viewed from the upstream side of the waste gas. The treated gas emanating from the reactor 201 may be supplied to the other waste gas pre-heaters. When the number of the waste gas pre-heaters is further increased, these waste gas pre-heaters can be disposed in the same manner as when the number of the waste gas pre-heaters is three.

Figure 3:
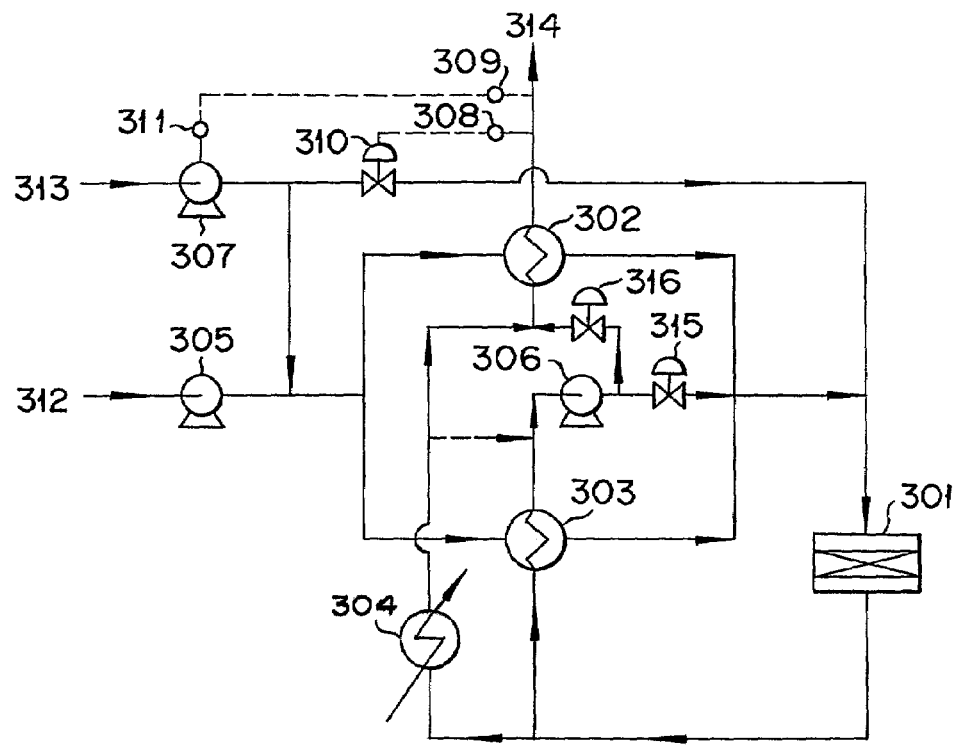
FIG. 3 is a diagram illustrating another flow sheet of the apparatus of this invention for the treatment of a waste gas.

FIG. 3 is a diagram illustrating another flow sheet of the apparatus of this invention for the treatment of the waste gas. The equipments and the devices that are used in the apparatus illustrated in FIG. 3 have the same functions as those illustrated in FIG. 2. They are denoted by reference numerals that result from adding 100 to the corresponding reference numerals used in FIG. 2. A large difference between the flow sheets of FIGS. 3 and 2 resides in the point that the apparatus in FIG. 3 has waste gas pre-heaters disposed parallelly, whereas the apparatus in FIG. 2 has waste gas pre-heaters disposed in series.

In FIG. 3, two waste gas pre-heaters 302 and 303 are disposed parallelly between a waste gas-supplying device 305 and a catalytic oxidation reactor 301. Since the waste gas pre-heaters in the present apparatus are substantially the same as those in the apparatus of FIG. 2 excepting they are disposed parallelly, the waste gas and the treated gas flow in the same manner as those in the apparatus of FIG. 2.

The apparatus described above has two waste gas pre-heaters disposed parallelly. In the case of the apparatus using three waste gas pre-heaters, the method of disposing such waste gas pre-heaters between the first pre-heater 302 (prior to the circulation blower) and the second pre-heater 303 or the method of disposing them between the second pre-heater 303 and the reactor 301 may be conceived. In this case, the flows of the waste gas and the treated gas are substantially the same as those illustrated in FIG. 3. The waste gas pre-heaters are reckoned as the first, second, and third waste gas pre-heaters as viewed from the downstream side of the treated gas. The treated gas emanating from the reactor 301 may be supplied to the other waste gas pre-heaters. When the number of the waste gas pre-heaters is further increased, these waste gas pre-heaters can be disposed in the same manner as when the number of the waste gas pre-heaters is three.

Figure 4:
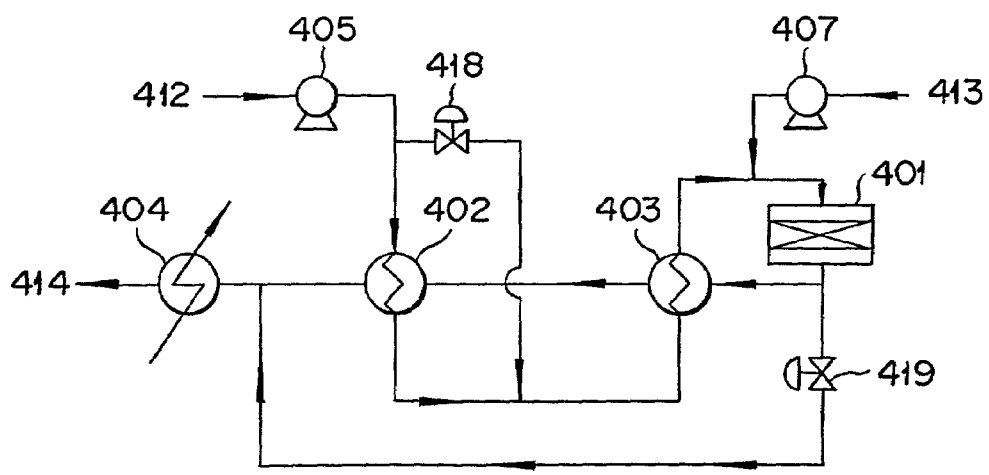
FIG. 4 is a diagram illustrating yet another flow sheet of the apparatus of this invention for the treatment of a waste gas.

FIG. 4 is a diagram illustrating yet another flow sheet of the apparatus of this invention for the treatment of a waste gas. The equipments and the devices that are used in the apparatus illustrated in FIG. 4 have the same functions as those illustrated in FIG. 2. They are denoted by reference numerals that result from adding 200 to the corresponding reference numerals used in FIG. 2. In FIG. 4, two waste gas pre-heaters 402 and 403 are disposed in series between a waste gas-supplying device 405 and a catalytic oxidation reactor 401. A bypass is furnished between the inlet and outlet of the first pre-heater 402 through a control valve 418. A molecular oxygen-containing gas-supplying device 407 is connected to the inlet of the reactor 401. The molecular oxygen-containing gas-supplying device 407 is naturally connected in various patterns such as, for example, to the waste gas inlet of the first pre-heater 402, between the first pre-heater 402 and the reactor 401, between the first pre-heater 402 and the waste gas inlet of the second pre-heater 403, and/or between the waste gas outlet of the second pre-heater 402 and the inlet of the reactor 401. Among other patterns mentioned above, the connection between the first pre-heater 402 and the inlet of the reactor 401 and particularly the connection to the inlet of the reactor 401 prove advantageous.

A waste gas 412 is advanced via the waste gas-supplying device 405 and the two waste gas pre-heaters 402 and 403 and introduced into the reactor 401 as mixed with a molecular oxygen-containing gas 413 from the molecular oxygen-containing gas supplying devices 407.

A heat-recovering device 404 is connected to the reactor 401 via a control valve 419 and further connected to the reactor 401 via the waste gas pre-heaters 402 and 403 as furnished parallelly thereto. The treated gas emanating from the first pre-heater 402 and, if necessary, the treated gas emanating from the reactor 401 are utilized as the heat source for a heat-recovering device 404.

The hot treated gas emanating from the reactor 401 is introduced to the heat-recovering device 404 via the two waste gas pre-heaters 402 and 403 and brought parallelly thereto to the heat-recovering device 404 via a control valve 419, then deprived of the heat, and finally released into the atmosphere.

When the heat of the waste gas generated in the reactor 401 is small and the dew point of the treated gas is comparatively low, it is commendable to use the apparatus illustrated in FIG. 4. In this case, the temperatures of the various parts in the apparatus can be maintained at respectively proper levels by adjusting the flow volume of the waste gas that is bypassing the first pre-heater 402. Further, since the heat-recovering device 404 is disposed at the most backward part of the treated gas flow path, it is only natural that the first pre-heater 402 has no possibility of entailing such trouble as dewing. Further, since no flow path for the treated gas bypasses the heat-recovering device 404 and the pressure of the steam generated in the heat-recovering device 404 can be lowered, the heat generated in the reactor 401 can be effectively recovered and the waste heat loss to the outside of the system can be decreased.

Incidentally, the equipments, devices, and means that form the apparatus are suitably connected with pipes.

The apparatus described above has two waste gas pre-heaters disposed in series. In the case of the apparatus using three waste gas pre-heaters, methods of disposing these waste gas pre-heaters between the first pre-heater 402 and the second pre-heater 403 and of disposing them between the first pre-heater 403 and the reactor 401 (prior to the supply of the molecular oxygen-containing gas) are conceivable. In this case, the flows of the waste gas and the treated gas are substantially the same as those illustrated in FIG. 4. These waste gas pre-heaters are reckoned as the first, second, and third waste gas pre-heaters as viewed from the upstream side of the waste gas. The treated gas emanating from the reactor 401 may be supplied to the other waste gas pre-heaters. Further, when the number of the waste gas pre-heaters is increased, such waste gas pre-heaters can be disposed in the same manner as when the number of waste gas pre-heaters is three.

Thus, a suitable apparatus for the treatment of the waste gas can be selected, depending on the heat of the waste gas and the degree of change of the dew point of the treated gas.

EXAMPLES

Now, this invention will be described specifically below with reference to examples. The description is given as divided into two cases; the one case having a large amount of heat generated in consequence of the catalytic oxidation of the waste gas and the other case having a small amount of such heat.

(1) Treatment of waste gas that generates a small amount of heat

Comparative Example 1

Figure 1:
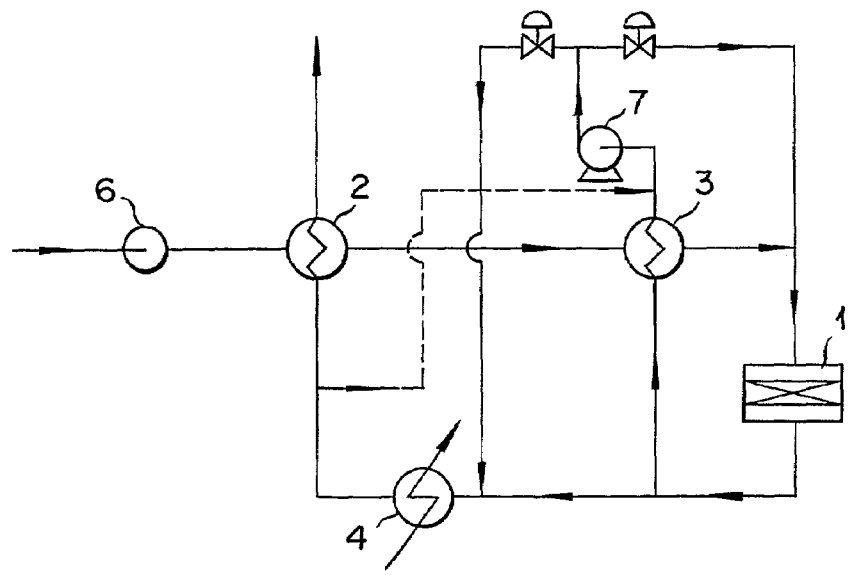
FIG. 1 is a diagram illustrating the flow sheet of the apparatus for the treatment of a waste gas according to the conventional technique.

Conventional Technique of FIG. 1

Part of the treated gas at the outlet of the reactor was supplied to the second pre-heater (the second heat exchanger) and spent therein to preheat the waste gas to be treated so as to maintain the temperature in the reactor at a proper level. The treated gas emanating from the second pre-heater was supplied together with the remaining treated gas to the heat-recovering device to allow recovery of heat entrained by the steam, further elevate the waste gas temperature in the first pre-heater (the first heat exchanger), and released into the atmosphere. Air was used as the molecular oxygen-containing gas for the treatment of the waste gas. It was supplied and mixed with the waste gas in advance.

As a result, no treated gas was recycled from the second pre-heater to the reactor or from the heat-recovering device (waste heat boiler) to the outlet of the second pre-heater. Though the temperature of the treated gas at the outlet of the first pre-heater (the first heat exchanger) was 109° C., the ability of the apparatus was gradually degraded because the first pre-heater formed dew on the treated gas (elevated temperature) side thereof and the scattered dust of a catalyst adhered to the heating surface. Since the sulfur component contained in a minute amount in the waste gas was condensed, the heating surface corroded and sustained a crack.

Example 1

Part of the treated gas was supplied to the first pre-heater without being passed through the heat-recovering device As a measure to cope with the trouble mentioned above, the flow path from the second pre-heater to the inlet of the heat-recovering device was changed so as to reach the outlet of the recovering device to decrease the amount of heat to be recovered. As a result, the temperature of the treated gas at the outlet of the first pre-heater was elevated till 115° C. and the condensation trouble was canceled.

Comparative Example 2

Increased Amount of Air for the Oxidation Reaction

When the amount of air in the apparatus illustrated in FIG. 1 was increased, the temperature of the treated gas was elevated only sparingly and the trouble of condensation was not cancelled. Further, the oxygen concentration in the treated gas was heightened and the operation was forced to proceed inefficiently by requiring supply of air in an unduly large amount.

Example 2

In FIG. 2, the molecular oxygen-containing gas was thrown into the waste gas prior to the reactor and the hot treated gas emanating from the reactor was supplied to the first pre-heater via the heat-recovering device, the second pre-heater, the circulation blower and the control valve. With the same amount of air as used heretofore, the temperature at the outlet of the first pre-heater was heightened till 127° C. and the condensation trouble was eliminated.

The results of Comparative Examples 1 and 2 and Examples 1 and 2 are shown in Table 1.

TABLE 1

| | During generation of low heat | | | |
|---|---|---|---|---|
| | Comparative Example 1 | Example 1 | Comparative Example 2 | Example 2 |
| (A) | 1200 | ← | ← | ← |
| (B) | | | | |
| (B-1) | 400 | ← | ← | ← |
| (B-2) | 40 | 40 | 92 | 0 |
| (B-3) | 0 | 0 | 0 | 40 |
| (B-4) | 40 | 40 | 92 | 40 |
| (B-5) | 440 | 440 | 492 | 400 |
| (B-6) | 440 | 440 | 492 | 440 |
| (B-7) | 250 | 242 | 332 | 255 |

TABLE 1-continued

| | During generation of low heat | | | |
|---|---|---|---|---|
| | Comparative Example 1 | Example 1 | Comparative Example 2 | Example 2 |
| (B-8) | 190 | 198 | 160 | 185 |
| (B-9) | 440 | 198 | 492 | 185 |
| (B-10) | 0 | ← | ← | ← |
| (B-11) | 250 | 242 | 332 | 255 |
| (B-12) | 0 | ← | ← | ← |
| (B-13) | 250 | 242 | 332 | 255 |
| (B-14) | 440 | 440 | 492 | 440 |
| (C) | | | | |
| (C-1) | 60 | ← | ← | ← |
| (C-2) | 412 | 412 | 443 | 412 |
| (C-3) | 700 | ← | ← | ← |
| (C-4) | 109 | 115 | 110 | 127 |
| (D) | 1.0 | 1.0 | 3.1 | 1.0 | wherein:

(A): Amount of heat generated by the reactor ($10^4$ kj/h)

(B): Flow volume ($Nm^3$/min)

(B-1): Amount of waste gas to be treated (B-2): Amount of air supplied as premixed (B-3): Amount of air supplied via the bypass (B-4): Total amount of air (B-5): Amount of gas at the inlet of the first pre-heater (B-6): Amount of gas at the inlet of the reactor (B-7): Amount of gas: Outlet of the reactor→the second pre-heater (B-8): Amount of gas: Outlet of the reactor→the waste heat boiler (B-9): Amount of waste gas at the inlet of the waste heat boiler (B-10): Amount of gas: Waste heat boiler→Circulation blower (B-11): Amount of gas at inlet of the circulation blower (B-12): Amount of gas: Circulation blower→Reactor (B-13): Amount of gas: Circulation blower→First waste gas pre-heater (B-14): Amount of waste gas at the inlet of the first pre-heater (C): Temperature conditions (° C.)

(C-1): Temperature of waste gas at in let of the first pre-heater (C-2): Temperature of the inlet of the reactor (C-3): Temperature of the outlet of the reactor (C-4): Temperature of the treated gas at the outlet of the first pre-heater (D): $O_2$ concentration (% by volume) in treated gas It is noted from the comparison of the results of Comparative Example 1 and Examples 1 and 2 given in Table 1 that in spite of the fact that the amount of air used for the oxidation reaction was equal between the examples under comparison, the temperature of the treated gas at the outlet of the first pre-heater could be elevated by supplying the treated gas emanating from the second pre-heater directly to the first pre-heater in the case of Examples 1 and 2, and the oxygen concentration in the treated gas at the outlet of the first pre-heater was equal between the examples under comparison.

(2) Treatment of waste gas that generates a large amount of heat

Comparative Example 3

Conventional Technique

Similarly to (1), part of the treated gas at the outlet of the reactor was supplied to the second pre-heater and spent therein to preheat the waste gas. In this case, since the heat generated in the reactor was large, the inside of the reactor was heated abnormally high temperature when the waste gas supplied from the outlet of the second pre-heater was supplied directly to the reactor. The abnormal elevation of the temperature inside the reactor was repressed by recycling the treated gas at the outlet of the second pre-heater to the inlet of the reactor. When the heat generated was larger, part of the gas at the outlet of the heat-recovering device was also recycled to the reactor. Incidentally, the air for the oxidation reaction was supplied and mixed with the waste gas in advance.

As a result, no inflow of gas occurred from the circulation blower to the first pre-heater (waste heat boiler).

In this case, though the temperature of the treated gas at the outlet of the first pre-heater was 128° C., the same trouble occurred as in the operation of Comparative Example 1.

Comparative Example 4

Increased Amount of Air for the Oxidation Reaction

In this case, since no inflow of gas occurred from the circulation blower to the first pre-heater (waste heat boiler), the temperature of the treated gas at the outlet of the first pre-heater could not be elevated by a simple change of the flow path as in the case of (1). In spite of the increase of the air for the oxidation reaction from 114 to 164 Nm³/min, the temperature was not elevated appreciably and the oxygen concentration in the treated gas was increased to 2.7 vol. % and the operation was forced to proceed inefficiently by requiring supply of air in an unduly large amount.

Example 3

In FIG. 2, part of the air (74 Nm³/min) was supplied as bypassed to the inlet of the reactor from the viewpoint of such factors as the catalyst, heat resistance of the component devices, and the stable operation of the apparatus. The abnormal elevation of the temperature in the reactor was repressed by recycling the treated gas at the outlet of the second pre-heater to the inlet of the reactor. When the heat generated was still larger, part of the outlet gas of the heat-recovering device was also recycled to the reactor.

With the same amount of the air as in Comparative Example 3, the temperature of the treated gas at the outlet of the first pre-heater was elevated till 137° C. and the trouble of condensation was eliminated.

The results of Comparative Examples 3 and 4 and Example 3 are shown in Table 2.

TABLE 2

|  | During generation of high heat | | |
|---|---|---|---|
|  | Comparative Example 3 | Comparative Example 4 | Example 3 |
| (A) | 3000 | ← | ← |
| (B) | | | |
| (B-1) | 420 | ← | ← |
| (B-2) | 114 | 164 | 40 |
| (B-3) | 0 | 0 | 74 |
| (B-4) | 114 | 164 | 114 |
| (B-5) | 534 | 584 | 460 |
| (B-6) | 534 | 584 | 534 |
| (B-7) | 190 | 200 | 207 |
| (B-8) | 344 | 384 | 327 |
| (B-9) | 344 | 384 | 327 |
| (B-10) | 125 | 67 | 108 |
| (B-11) | 315 | 267 | 315 |
| (B-12) | 315 | 267 | 315 |
| (B-13) | 0 | ← | ← |
| (B-14) | 534 | 584 | 534 |
| (C) | | | |
| (C-1) | 60 | ← | ← |
| (C-2) | 300 | ← | ← |
| (C-3) | 700 | ← | ← |
| (C-4) | 128 | 129 | 137 |
| (D) | 1.0 | 2.7 | 1.0 | wherein:
(A): Amount of heat generated by the reactor ($10^4$ kj/h)
(B): Flow volume (Nm³/min)
(B-1): Amount of gas to be treated
(B-2): Amount of air supplied as premixed
(B-3): Amount of air supplied via the bypass
(B-4): Total amount of air
(B-5): Amount of gas at the inlet of the first pre-heater
(B-6): Amount of gas at the inlet of the reactor
(B-7): Amount of gas: Outlet of the reactor→the second pre-heater
(B-8): Amount of gas: Outlet of the reactor→the waste heat boiler
(B-9): Amount of waste gas at the inlet of the waste heat boiler
(B-10): Amount of gas: Waste heat boiler→Circulation blower
(B-11): Amount of gas at inlet of the circulation blower
(B-12): Amount of gas: Circulation blower→Reactor
(B-13): Amount of gas: Circulation blower→First waste gas pre-heater
(B-14): Amount of waste gas at the inlet of the first pre-heater
(C): Temperature conditions (° C.)
(C-1): Temperature of waste gas at inlet of the first pre-heater
(C-2): Temperature of the inlet of the reactor
(C-3): Temperature of the outlet of the reactor
(C-4): Temperature of the treated gas at the outlet of the first pre-heater
(D): $O_2$ concentration (% by volume) in treated gas It is noted from the comparison of the results of Comparative Example 3 and Example 3 given in Table 2 that in spite of the fact that the amount of air used for the oxidation reaction was equal between the examples under comparison, the temperature of the treated gas at the outlet of the first pre-heater could be elevated in the case of Example 3.

The oxygen concentration in the treated gas at the outlet of the first pre-heater was equal between the examples under comparison.

The entire disclosure of Japanese Patent Application Nos. 2000-167973 filed on Jun. 5, 2000 including specification, claims, drawings and summary are incorporated herein by reference in its entirety.

What is claimed is:

1. An apparatus for treating a waste gas containing a combustible compound comprising:
   a catalytic oxidation reactor for treating the waste gas by combustion,
   a device for supplying the waste gas to the reactor,
   at least a first pre-heater device and a second pre-heater device for heating the waste gas prior to its entry into the reactor;
   a heat-recovery device for recovering heat from treated gas emanating from the reactor; and
   a molecular oxygen-containing gas supplying device for supplying molecular oxygen-containing gas to a waste gas inlet of the first pre-heater device and to at least one region of the apparatus between a waste gas outlet of the first pre-heater device and an inlet of the reactor,
   means for supplying the treated gas emanating from the reactor to the second pre-heater device and to the heat-recovery device as a heat source, and
   means for supplying treated gas emanating from the second pre-heater device to the first pre-heater device as a heat source wherein the molecular oxygen-containing gas supplying device is connected to the waste gas inlet of the first pre-heater device, and further is connected to:
   a region of the apparatus between the waste gas outlet of the first pre-heater device and the waste gas inlet of the second pre-heater device; and/or
   a region of the apparatus between the waste gas outlet of the second pre-heater device and the inlet of the reactor; and
   a temperature measuring means for the treated gas emanating from said first waste gas pre-heater; and
   a molecular oxygen-containing gas flow controller to adjust the amount of the molecular oxygen-containing gas supplied to an arbitrary point between the waste gas outlet of said first waste gas pre-heater and the waste gas inlet of said reactor;
   the temperature of the treated gas emanating from said first waste gas pre-heater being set at an arbitrary level by adiusting the amount of said molecular oxyaen-contain gas.

2. The apparatus according to claim 1 wherein the apparatus is adapted to allow treated gas emanating from the second pre-heater device to be supplied to the first pre-heater device as a heat source without being passed through the heat-recovery device.

3. The apparatus of claim 1 wherein the molecular oxygen-containing gas supply is a device furnished with a driving part capable of being driven at various revolutions.

* * * * *